United States Patent
Bae et al.

(10) Patent No.: US 8,609,273 B2
(45) Date of Patent: Dec. 17, 2013

(54) ANODE COATED WITH LITHIUM FLUORIDE COMPOUNDS, METHOD FOR PREPARING THE SAME, AND LITHIUM SECONDARY BATTERY HAVING THE SAME

(75) Inventors: Yoon-Jung Bae, Daejeon (KR); Han-Ho Lee, Daejeon (KR); Jin-Hyuk Min, Daejeon (KR); Eun-Ju Lee, Daejeon (KR); Jong-Seok Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 399 days.

(21) Appl. No.: 12/919,148

(22) PCT Filed: Feb. 24, 2009

(86) PCT No.: PCT/KR2009/000867
§ 371 (c)(1),
(2), (4) Date: Apr. 1, 2011

(87) PCT Pub. No.: WO2009/107964
PCT Pub. Date: Sep. 3, 2009

(65) Prior Publication Data
US 2011/0177388 A1    Jul. 21, 2011

(30) Foreign Application Priority Data
Feb. 25, 2008 (KR) ........................ 10-2008-0016734

(51) Int. Cl.
*H01M 2/16* (2006.01)
*C25D 5/54* (2006.01)

(52) U.S. Cl.
USPC .................... 429/137; 429/231.8; 205/111

(58) Field of Classification Search
USPC ................ 429/137, 231.4, 231.8; 205/111
See application file for complete search history.

(56) References Cited

U.S. PATENT DOCUMENTS

| | | | |
|---|---|---|---|
| 2002/0182488 A1 | 12/2002 | Cho et al. | |
| 2004/0197641 A1* | 10/2004 | Visco et al. | 429/137 |
| 2005/0042503 A1 | 2/2005 | Kim et al. | |

FOREIGN PATENT DOCUMENTS

| CN | 1389940 A | 1/2003 |
|---|---|---|
| CN | 1610167 A | 4/2005 |
| JP | 1998-189009 A | 7/1998 |
| JP | 2000-323124 A | 11/2000 |
| JP | 2004-171875 A | 6/2004 |
| JP | 2006-179305 A | 7/2006 |
| JP | 2006-331749 A | 12/2006 |
| KR | 10-2001-0086972 A | 9/2001 |
| KR | 10-2002-0091748 A | 12/2002 |
| KR | 10-2005-0020498 A | 3/2005 |

OTHER PUBLICATIONS

International Search Report and Written Opinion of the International Searching Authority, dated Oct. 16, 2009, for International Application No. PCT/KR2009/000867 (Forms PCT/ISA/210 and PCT/ISA/237).

* cited by examiner

*Primary Examiner* — Stephen J. Kalafut
(74) *Attorney, Agent, or Firm* — Birch, Stewart, Kolasch & Birch, LLP

(57) ABSTRACT

An anode for a lithium ion secondary battery includes an anode, and a LiF-based coating layer formed with LiF-based particles on a surface of the anode. The LiF-based coating layer has a thickness of 0.05 to 1 μm. The anode allows the LiF-based coating layer created by side reaction of $LiPF_6$ during a battery charging/discharging process to be relatively uniformly formed on the anode surface, thereby elongating the life cycle of a lithium ion secondary battery.

8 Claims, 3 Drawing Sheets

Fig. 1]
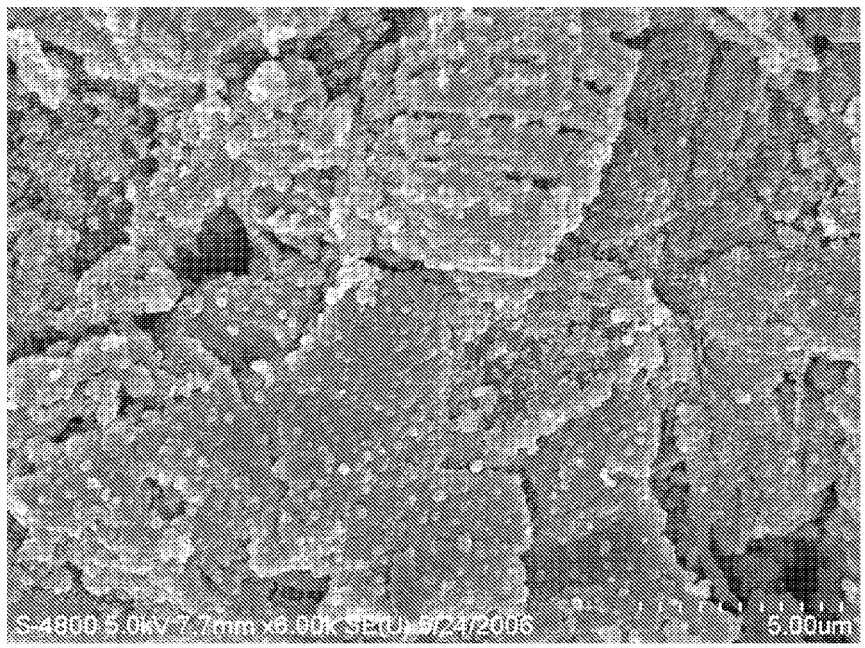
Fig. 2
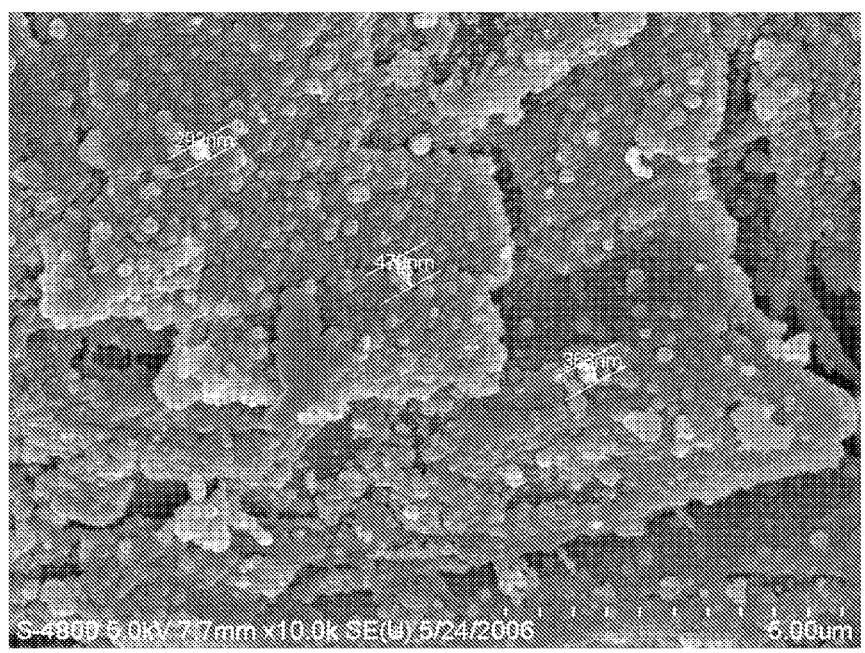

ANODE COATED WITH LITHIUM FLUORIDE COMPOUNDS, METHOD FOR PREPARING THE SAME, AND LITHIUM SECONDARY BATTERY HAVING THE SAME

TECHNICAL FIELD

The present invention relates to an anode for a lithium ion secondary battery and its preparation method. More particularly, the present invention relates to an anode for a lithium ion secondary battery, which has a separate coating layer to improve a cell life in the long term, and its preparation method.

BACKGROUND ART

Recently, along with the development of information communication industries, electronic devices become smaller, lighter, slimmer and more portable. In this trend, demands on a high energy density battery used as a power source of such electronic devices have increased. A lithium ion secondary battery is one of the most satisfactory batteries, and numerous studies towards improvements are now in progress actively.

A lithium ion secondary battery includes a cathode, an anode and an electrolyte and a separator that give paths of lithium ions between the cathode and the anode. When lithium ions are intercalated or disintercalated at the cathode and the anode, oxidation and reduction reactions are made to generate electric energy. In an early stage of lithium ion secondary batteries, lithium metal with high energy density was used as an anode, and a liquid solvent was used as an electrolyte. However, this early-stage lithium ion secondary battery exhibits bad life cycle due to dendrite. To solve this disadvantage, there were developed lithium ion secondary batteries in which carbon material capable of absorbing a large amount of lithium ions was used as an anode instead of lithium metal, and an electrolyte was composed of organic liquid or solid polymer.

However, as charging and discharging are repeated for the lithium ion secondary battery using carbon material as an anode, LiF generated by side reaction of $LiPF_6$ used as an electrolyte is irregularly formed on an anode surface, which deteriorates performance of the battery and resultantly shortens the life cycle of the battery.

Korean Patent Registration No. 0433822 and Japanese Laid-open Patent Publication No. 2000-012026 disclose a technique for coating an anode surface with metal or metal oxide, and Korean Patent Registration No. 0324623 discloses a technique for forming a porous metal film on an anode surface. However, all of them are not successful in solving the irregular formation of LiF on an anode surface.

DISCLOSURE OF INVENTION

Technical Problem

The present invention is designed to solve the problems of the prior art, and therefore it is an object of the present invention to provide an anode for a lithium ion secondary battery, which allows LiF to be relatively regularly formed on an anode surface; a method for preparing the same; and a lithium ion secondary battery having the same.

Technical Solution

In order to accomplish the above object, the present invention provides an anode for a lithium ion secondary battery, which includes an anode; and a LiF-based coating layer formed with LiF-based particles on a surface of the anode. The anode of the present invention allows the LiF-based coating layer created by side reaction of $LiPF_6$ during a battery charging/discharging process to be relatively uniformly formed on the anode surface, thereby elongating the life cycle of a lithium ion secondary battery, though an initial performance is deteriorated to some extent.

In the anode for a lithium ion secondary battery according to the present invention, the LiF-based coating layer preferably has a thickness of 0.05 to 1 μm.

In another aspect of the present invention, there is also provided a method for preparing an anode for a lithium ion secondary battery, which includes (S1) forming a three-electrode cell or a two-electrode cell by immersing an anode in an electrolyte solution obtained by dissolving $LiPF_6$ in a carbonate-based organic solvent; and (S2) applying a voltage or current to the cell to form a coating layer with LiF-based particles on a surface of the anode, wherein the above process is executed under a moisture circumstance.

Advantageous Effects

The anode for a lithium ion secondary battery, having a LiF-based coating layer as disclosed above, allows a LiF layer to be relatively uniformly formed on an anode surface at an initial stage, thereby restraining high temperature degradation of a battery, though an initial capacity of the battery might be deteriorated to some extent.

BRIEF DESCRIPTION OF DRAWINGS

FIG. 1 is a SEM photograph (6,000 magnifications) showing a surface of an anode prepared according to an example 1 of the present invention;

FIG. 2 is a SEM photograph (10,000 magnifications) showing the surface of the anode prepared according to the example 1 of the present invention;

BEST MODE FOR CARRYING OUT THE INVENTION

Figure 3:
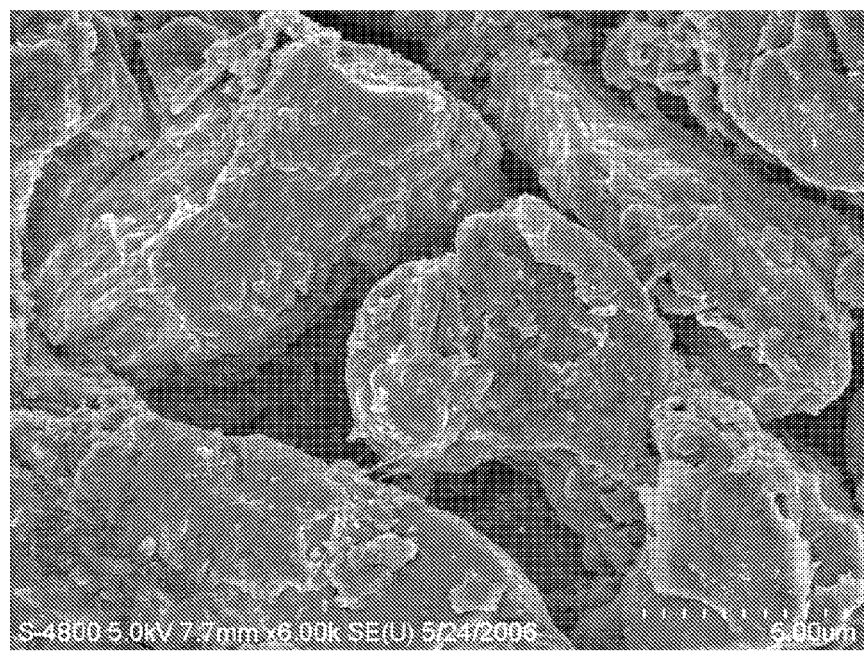
FIG. 3 is a SEM photograph (6,000 magnifications) showing a surface of an anode prepared according to a comparative example 1.

Hereinafter, an anode for a lithium ion secondary battery, coated with a LiF layer, according to the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The anode for a lithium ion secondary battery according to the present invention includes an anode and a LiF-based coating layer formed with LiF-based particles on a surface of the anode. If charging and discharging are repeated for the lithium ion secondary battery, LiF is formed on a surface of the anode due to side reaction of electrolyte $LiPF_6$ in an electrolyte solution, which deteriorates performance of the battery. Moreover, the LiF caused by side reaction is formed irregularly, thereby accelerating the performance deterioration of a battery. If a LiF-based coating layer is provided on an anode surface in advance as mentioned above, though an initial performance of a battery is deteriorated to some extent, LiF caused by side reaction of $LiPF_6$ is formed relatively regularly during a battery charging/discharging process, thereby decelerating the performance degradation of a battery. If the performance degradation of a battery is decelerated, the performance of a battery is maintained for a relatively long term, and the life cycle of the battery may be elongated.

The LiF-based coating layer as mentioned above preferably has a thickness of 0.05 to 1 µm. The coating layer may become uniform when its thickness is 0.05 µm or more. Also, the most suitable initial cell resistance is obtained within the above thickness range.

In the anode for a lithium ion secondary battery according to the present invention, the anode may adopt any one generally used for lithium ion secondary batteries without any special limitation. For example, the anode may be prepared by forming an anode active material layer on a current collector using an anode active material composition including an anode active material, a binder, a conductive material and a solvent.

At this time, the anode current collector representatively employs a foil made of copper, gold, nickel or copper alloy, or their combinations. The anode active material layer may be formed by directly coating the current collector with the anode active material composition or by applying the anode active material composition onto a separate support and then drying it such that a film separated from the support is laminated on a current collector. Here, the support may adopt any element capable of supporting the active material layer. For example, the support may be a Mylar film or a PET (polyethyleneterephthalate) film.

The anode active material, the binder, the conductive material and the solvent may adopt any ones commonly used in making lithium secondary batteries. For example, the anode active material may representatively employ lithium-occluding material such as lithium metal or its alloy, or carbon material. Among them, the carbon material may be low crystallinity carbon or high crystallinity carbon. The low crystallinity carbon may be representatively soft carbon or hard carbon. The high crystallinity carbon may be representatively high temperature curing carbon such as natural graphite, Kish graphite, pyrolytic carbon, mesophase pitch based carbon fiber, meso-carbon microbeads, mesophase pitches, and petroleum or coal tar pitch derived cokes.

The binder may use any one of vinylidenefluoride-hexafluoropropylene-copolymer (PVDF-co-HFP), polyvinylidenefluoride, polyacrylonitrile and polymethylmethacrylate, or their mixtures. The conductive material may representatively use carbon black or acetylene black, and the solvent may representatively use acetone or N-methylpyrrolidone.

Hereinafter, a method for preparing the anode for a lithium ion secondary battery, which has a LiF-based particle layer formed thereon, according to the present invention is explained in detail.

First, the above anode is immersed in a carbonate-based organic solvent in which $LiPF_6$ is dissolved, thereby forming a three-electrode cell or a two-electrode cell (S1).

Here, the carbonate-based organic solvent may adopt any one useable for lithium ion secondary batteries. For example, the carbonate-based organic solvent may use at least one selected from the group consisting of ethylene carbonate, propylene carbonate, dimethyl carbonate, diethyl carbonate, methylpropyl carbonate, ethylpropyl carbonate, ethylmethyl carbonate, butylene carbonate and fluorinated vinyl carbonate.

In particular, among the above carbonate-based organic solvents, cyclic carbonates such as ethylene carbonate and propylene carbonate are preferred since they are high-viscous organic solvents with good dielectric constants, which may easily dissociate lithium salts in an electrolyte. If low-viscous low-dielectric linear carbonate such as dimethyl carbonate and diethyl carbonate is mixed to the cyclic carbonate at a suitable ratio, it is possible to make an electrolyte solution with high electric conductivity, which is more desirable.

Subsequently, a coating layer having LiF-based particles is formed on a surface of the anode by applying a voltage or current to the cell (S2).

If a voltage or current is applied to the above three-electrode or two-electrode cell, a coating layer made of LiF-based particles is formed on the anode surface. At this time, thickness and density of the LiF-based coating layer may be controlled depending on voltage or current conditions. For ensuring very effective electrolysis of the electrolyte, the voltage applied to the three-electrode or two-electrode cell is preferably set to 0.1 to 3 V (vs. $Li/Li^+$), more preferably 0.5 to 2.5 V. As mentioned above, the LiF-based coating layer preferably has a thickness of 0.05 to 1 µm, more advantageously for initial resistance of the cell.

In case of an electrolyte solution using a general organic solvent, it is unavoidable that a small amount of moisture is included in the electrolyte solution though organic solvent is used. In the present invention, in addition to moisture inherently included in the electrolyte solution, the anode is made under a moisture circumstance, which is more effective when forming a coating layer on the anode surface. A moisture circumstance with a moisture concentration of 50 to 2,000 ppm in weight allows easy formation of the coating layer, but the present invention is not limited to the range.

The present invention also provides a lithium ion secondary battery including an anode with a LiF-based coating layer as disclosed above.

The lithium ion secondary battery of the present invention may be manufactured in a common way well known in the art. For example, the lithium ion secondary battery may be prepared by assembling an anode and a cathode with a separator being interposed between them and then injecting an electrolyte solution therein.

In the present invention, the cathode is not specially limited, and the cathode may be made in a common way well known in the art such that cathode active material is settled to a cathode current collector.

The cathode active material may adopt any material useable for cathodes of existing lithium ion secondary batteries. Particularly, the cathode active material may use lithium manganese oxide, lithium cobalt oxide, lithium nickel oxide, lithium iron oxide, or lithium composite oxide that is a combination of the above oxides, but not limitedly.

The cathode current collector may use a foil made of aluminum, nickel or their combinations, but not limitedly.

The electrolyte solution useable in the present invention includes a salt represented by the formula of $A^+B^-$, wherein $A^+$ represents an alkali metal cation such as $Li^+$, $Na^+$, $K^+$ or their combinations, and $B^-$ represents an salt containing an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or their combinations. The salt may be dissolved or dissociated in an organic solvent composed of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone), or their mixtures. However, the electrolyte solution useable in the present invention is not limited to the above examples.

The separator may use any porous material capable of preventing an internal short circuit of both electrodes and allowing immersion in the electrolyte. For example, the separator may adopt a polypropylene-based, polyethylene-based or polyolefin-based porous separator or a composite porous separator made by adding inorganic material to the above porous separator, but not limitedly.

The lithium ion secondary battery of the present invention may have any appearance such as a cylindrical shape using a can, an angled shape, a pouch shape or a coin shape, not limitedly.

MODE FOR THE INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

EXAMPLE 1

$LiPF_6$ was added to an organic solvent mixture solution in which ethylene carbonate and ethylmethyl carbonate were mixed at a volume ratio of 1:2 such that 1M concentration was obtained, and a three-electrode beaker cell was configured using a carbon material anode as a working electrode and using lithium metals as a standard electrode and a counter electrode, respectively. Here, a voltage (scan rate: 0.5 mV/s) was applied thereto up to 0.1V (vs. $Li/Li^+$) in a cyclic voltammetry method to form a coating layer on the anode. This example was executed in a dry box (with moisture ($H_2O$) of about 50 ppm in weight) so as to avoid direct exposure to the air. FIGS. 1 and 2 are SEM photographs showing a surface of the anode prepared according to this example. Seeing FIGS. 1 and 2, particles of 0.3 to 0.5 μm are observed on the anode surface.

Figure 4:
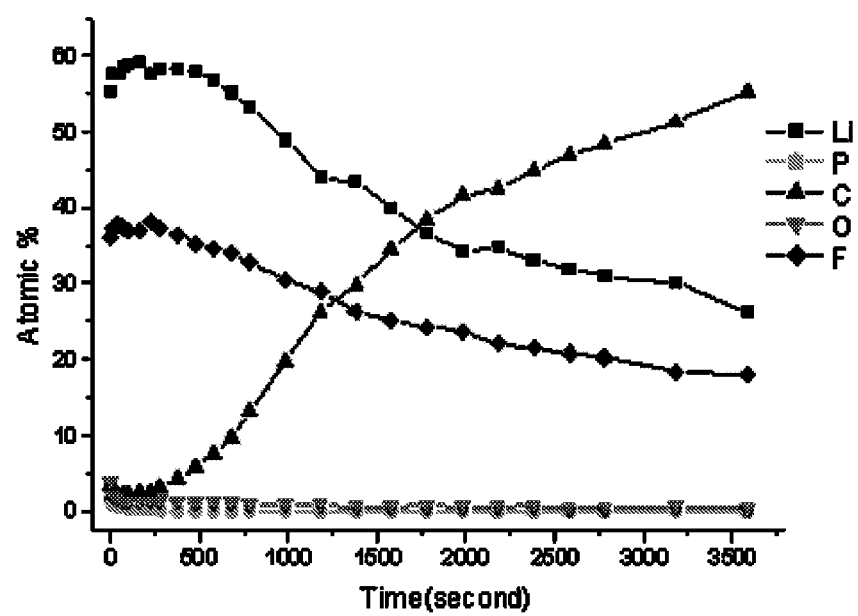
FIG. 4 is a graph showing a XPS analysis result of the anode prepared according to the example 1 of the present invention.

Also, XPS analysis results are shown in FIG. 4 as a graph. As shown in FIG. 4, it could be found that an excessive amount of Li and F are existing on the anode surface, and it is expected that the particles on the anode surface, shown in FIGS. 1 and 2, are $Li_xF_y$-based compound.

EXAMPLE 2

$LiPF_6$ was added to an organic solvent mixture solution in which ethylene carbonate and ethylmethyl carbonate were mixed in a volume ratio of 1:2 such that 1M concentration was obtained, and moisture ($H_2O$) of 1000 ppm in weight was added to the electrolyte solution. A coin cell was made using a graphite anode material, a cathode material of $LiMn_2O_4$:Li $(CO_{1/3}Ni_{1/3}Mn_{1/3})O_2$=7:3, and a porous separator.

COMPARATIVE EXAMPLE 1

Figure 5:
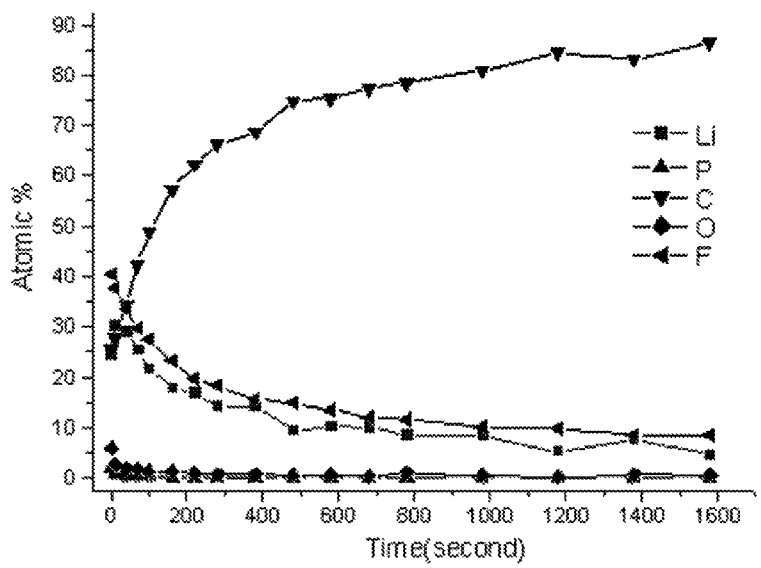
FIG. 5 is a graph showing a XPS analysis result of the anode prepared according to a comparative example 1.

An anode was manufactured in the same way as the example 1, except that a voltage is not applied after a beaker cell was prepared. A SEM photograph of the anode prepared according to the comparative example 1 is shown in FIG. 3, and XPS analysis results are shown in FIG. 5 as a graph.

COMPARATIVE EXAMPLE 2

A coin cell was manufactured in the same way as the comparative example 2, except that moisture was not injected to the electrolyte solution.

Test of C-Rate Characteristic of High Temperature Storage Cell

The influence of the $Li_xF_y$ anode surface layer on the cell performance was evaluated using the coin cells prepared according to the example 2 and the comparative example 2.

For the comparison of cell performances with respect to high temperature storage, each coin cell was stored at 50° C. for 1 week, and then the degree of capacity degradation and c-rate characteristics of the cell were compared. Capacity degradation was observed as 18% for the example 2 and 14% for the comparative example 2, which shows that capacity degradation is increased due to the addition of moisture.

Figure 6:
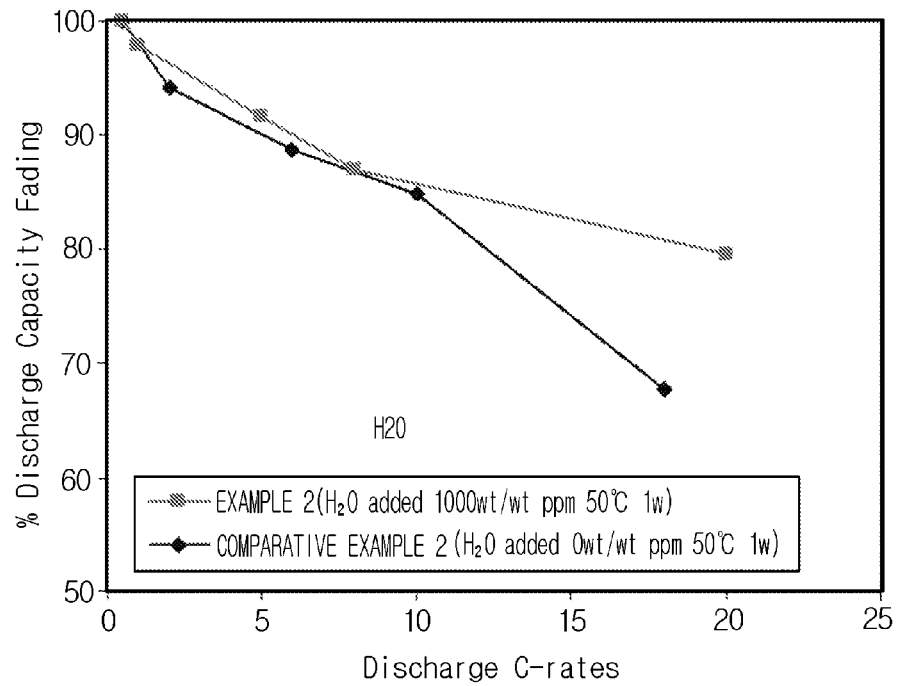
FIG. 6 is a graph showing an analysis result of c-rate characteristics of coin cells prepared according to an example 2 of the present invention and a comparative example 2.

Meanwhile, c-rate characteristics after 50° C. storage are shown in FIG. 6 as a graph. Seeing FIG. 6, it could be found that c-rate characteristics are greatly improved in the coin cell of the example 2. In other words, it would be understood that, in the coin cell of the example 2, high temperature safety of an anode film is improved to control the increase of film resistance.

The invention claimed is:

1. An anode for a lithium ion secondary battery, comprising:
    an anode comprising a carbon-based anode active material; and
    a LiF-based coating layer formed with LiF-based particles on a surface of the anode.

2. The anode for a lithium ion secondary battery according to claim 1, wherein the LiF-based coating layer has a thickness of 0.05 to 1 μm.

3. A method for preparing an anode for a lithium ion secondary battery, comprising:
    (S1) forming a three-electrode cell or a two-electrode cell by immersing an anode in an electrolyte solution obtained by dissolving $LiPF_6$ in a carbonate-based organic solvent; and
    (S2) applying a voltage or current to the cell to form a coating layer with LiF-based particles on a surface of the anode,
    wherein the above process is executed under a moisture circumstance, and the electrolyte solution comprises moisture, or the step of (S2) is conducted in moisture-containing air.

4. The method for preparing an anode for a lithium ion secondary battery according to claim 3, wherein the carbonate-based organic solvent is any one selected from the group consisting of ethylene carbonate, propylene carbonate, dimethyl carbonate, diethyl carbonate, methylpropyl carbonate, ethylpropyl carbonate, ethylmethyl carbonate, butylene carbonate and fluorinated vinyl carbonate, or their mixtures.

5. The method for preparing an anode for a lithium ion secondary battery according to claim 3, wherein the coating layer formed with LiF-based particles in the step (S2) has a thickness of 0.05 to 1 μm.

6. The method for preparing an anode for a lithium ion secondary battery according to claim 3, wherein the voltage applied to the three-electrode cell or the two-electrode cell in the step (S2) is 0.1 to 3 V (vs. $Li/Li^+$).

7. The method for preparing an anode for a lithium ion secondary battery according to claim 3, wherein the moisture circumstance is made by including moisture of 50 to 2,000 ppm in weight.

8. A lithium ion secondary battery, which includes a cathode, an anode, an electrolyte and a separator, wherein the anode is an anode defined in the claim 1.

\* \* \* \* \*